United States Patent
Stebnicki et al.

[11] Patent Number: 6,164,439
[45] Date of Patent: *Dec. 26, 2000

[54] THERMOPLASTIC CONNECTING PIN

[75] Inventors: James C. Stebnicki; Robert E. Mitchell, both of Milwaukee, Wis.

[73] Assignee: Rexnord Corporation, Milwaukee, Wis.

[*] Notice: This patent issued on a continued prosecution application filed under 37 CFR 1.53(d), and is subject to the twenty year patent term provisions of 35 U.S.C. 154(a)(2).

[21] Appl. No.: 09/213,311

[22] Filed: Dec. 16, 1998

[51] Int. Cl.[7] .................................................. B65G 17/06
[52] U.S. Cl. .......................................... 198/853; 474/218
[58] Field of Search .................................... 198/853, 851; 474/218, 206, 207

[56] References Cited

U.S. PATENT DOCUMENTS

| | | | |
|---|---|---|---|
| 4,023,239 | 5/1977 | Stolz | 24/33 P |
| 4,024,605 | 5/1977 | Henke | 24/33 P |
| 4,050,323 | 9/1977 | I'Anson | 74/251 |
| 4,195,887 | 4/1980 | Ruddell | 305/42 |
| 4,765,454 | 8/1988 | Hodlewsky et al. | 198/635 |
| 4,903,824 | 2/1990 | Takahashi | 198/853 |
| 5,020,659 | 6/1991 | Hodlewsky | 198/853 |
| 5,092,118 | 3/1992 | VanDeMark | 59/84 |
| 5,125,874 | 6/1992 | Fryer et al. | 474/214 |
| 5,176,247 | 1/1993 | Counter et al. | 198/831 |
| 5,461,852 | 10/1995 | Nagamatsu | 59/84 |
| 5,573,106 | 11/1996 | Stebnicki et al. | 198/853 |
| 5,586,643 | 12/1996 | Zabron et al. | 198/853 |
| 5,662,211 | 9/1997 | Quentin | 198/853 |
| 5,678,683 | 10/1997 | Stebnicki et al. | 198/853 |
| 5,996,776 | 12/1999 | Van Zijderveid | 198/853 |
| 6,006,898 | 12/1999 | Odink | 198/853 |
| 6,036,002 | 3/2000 | Kobayashi et al. | 198/853 |

*Primary Examiner*—Christopher P. Ellis
*Assistant Examiner*—Rashmi Sharma
*Attorney, Agent, or Firm*—Quarles & Brady LLP

[57] ABSTRACT

The invention disclosed herein is a connector pin for a modular conveyor belt. The connector pin is fabricated from two separate materials and includes a high strength polymer core which is covered by a low-friction polymer shell. The connector pin is used with a modular conveyor belt that includes a first conveyor link having a link end which is intermeshed with a link end on a second similar conveyor link. The openings in the first link and the second link are axially aligned with respect to each other such that they receive the connector pin of the present invention therein.

8 Claims, 3 Drawing Sheets

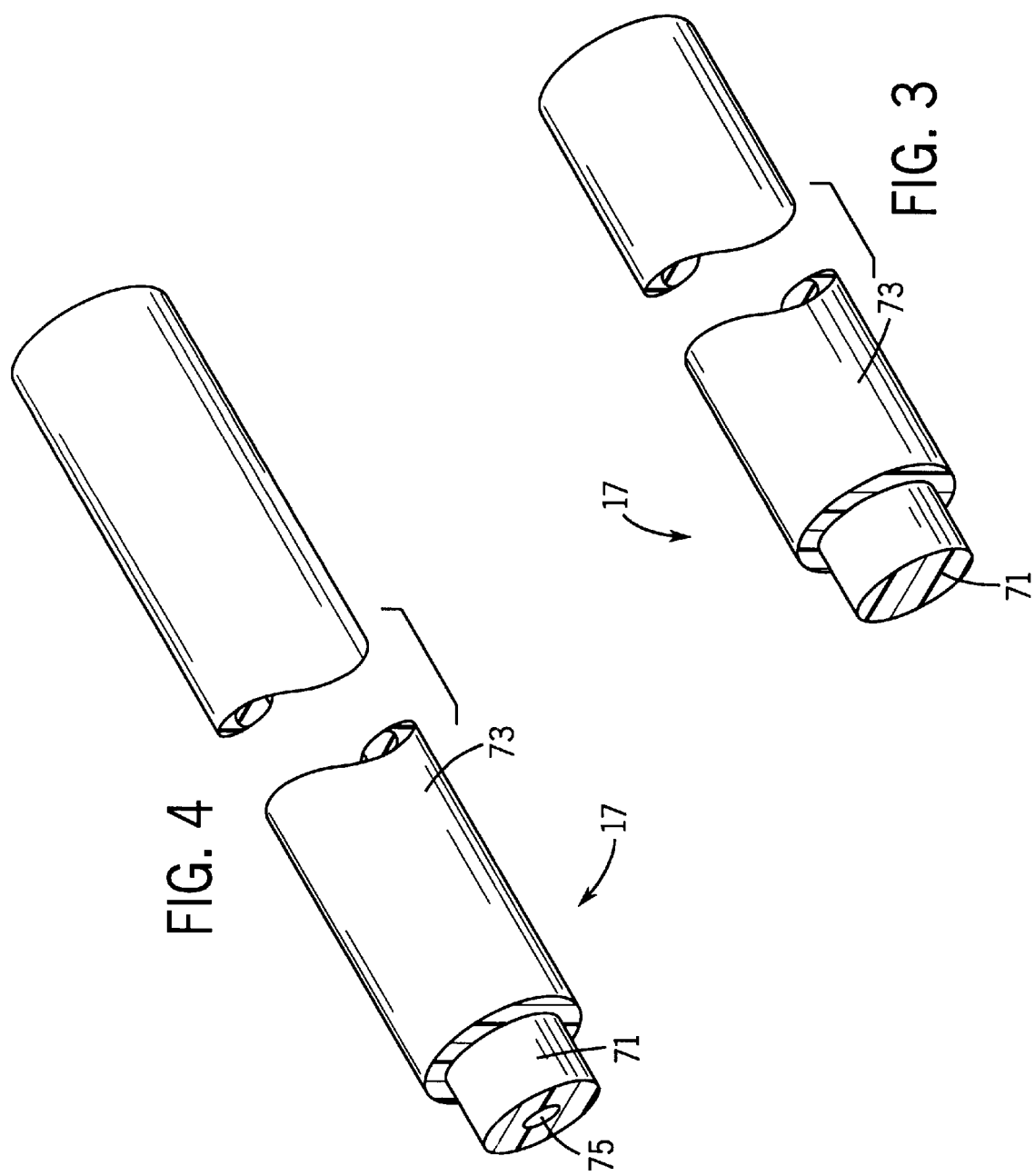

THERMOPLASTIC CONNECTING PIN

BACKGROUND OF INVENTION

Modular conveyor belts have been highly developed over the years. The belt links making up the conveyor typically each have a plurality of spaced link ends which intermesh with complimentary link ends projecting from a link or links in an adjacent row. A connecting pin runs through the meshing link ends to permit pivotal movement of the adjacent links such that the adjacent links are connected in a hinge-type configuration. Typically, the connecting pins include ends at each side edge of the conveyer belt, and the ends have a head that prevents the connecting pin from moving transversely relative to the conveyor. The head on one end of the connecting pin can be preformed, but the heads may also be formed by heat and pressure after the pin has been placed in position. Alternatively, plugs can be inserted into the openings in the link ends at each side edge of the conveyor belt. These plugs restrain the pins within the link ends.

The individual links which comprise modular conveyor belt are typically similar in width and are arranged in a bricked configuration. During operation the links may be subject to forces that tend to separate laterally adjacent links. The connecting pins are subjected to localized sheer stresses due to the tensile loading of the chain links.

The connecting pins are also prone to bending between the link ends of the conveyor modules. This pin bending causes point contact between the connecting pins and the internal edges of the link ends. Where there is point contact between the link ends and the connecting pin (instead of preferred surface contact between the pin and the inner bearing surface of the link ends), the connecting pin and the link ends tend to wear significantly.

Conventional connecting pins are typically made of thermoplastic (e.g., acetal, polyester, nylon and polypropylene). The choice of the thermoplastic used for the connecting pin usually depends on the physical properties which are desired (i.e., high-strength, low friction and/or suitability for use under extreme cyclic temperatures, chemical resistivity). The strength of the pin is especially important because a stronger pin with increased mechanical properties such as shear strength, tensile strength, tensile modulus of elasticity, flexural modulus of elasticity increases the mechanical properties of the modular conveyor belt and reduces stretch due to loading.

Another important consideration in selecting the material for a connecting pin is the need to control the expansion of the modular conveyor belt under extreme cyclic temperatures and high tensile loading. One typical application where a modular conveyor belt is subject to extreme cyclic temperature and high tensile loading is where cans or bottles are transported through pasteurizers used in breweries. The high temperatures in a pasteurizer and the slow movement of the cans or bottles through the pasteurizer cause the chain to stretch such that the bottom portion of an endless conveyor chain sags. The chain also stretches considerably due to tensile load. This chain stretching effects the performance of the drive sprocket and conveyor link interaction. In addition, in double deck conveyor systems, the sagging can become so great that the bottom portion of an endless conveyor belt can knock over bottles located on the top of a lower conveyor belt.

As stated previously, the connecting pins and link ends wear during operation of the conveyor. This wear is caused by abrasion between the connector pins and link ends. Some of the conventional connector pins are made from low-friction thermoplastics characteristics that minimize wear between the connector pins and the link ends. However, low friction thermoplastics typically lack other characteristics which are desired in a connector pin.

One typical connector pin is disclosed in U.S. Pat. No. 4,240,605. This patent discloses a flexible hinge pin for connecting belt fasteners. The pin has multiple metallic wire strands which make up the central stranded core. The strands are then wrapped with a metallic ribbon and the assembly is covered with a flexible Nylon covering. The disclosed pin is intended to provide high flexibility.

Another connector pin is disclosed in U.S. Pat. No. 4,230,239. This patent discloses a flexible coupling rod for connecting the ends of a conveyor belt. The coupling rod comprises a flexible core and pushed-on interlocking metallic sleeves.

Another known connector pin is disclosed in U.S. Pat. No. 5,461,852. This patent discloses a chain and connecting pin made from fiber reinforced thermoplastic resin. The pin is formed by injection molding glass fiber reinforced polyamide.

Another such connecting pin is disclosed in U.S. Pat. No. 5,125,874. The disclosed connector pin comprises rectangular hinge strips made of a flexible material for use with a modular conveyor belt suitable for abrasive environments. The hinge strips are typically made from a thermoplastic resin which is extruded to properly orient the grain structure.

A connecting pin is also disclosed in U.S. Pat. No. 4,903,824. The patent discloses a carbon or ceramic conveyor belt hinged with connecting pins made from the same carbon or ceramic material. The connecting pins are made by using the carbon or ceramic fibers twisted to and stiffened by carbonic adhesive to linear wires.

SUMMARY OF THE INVENTION

The present invention is a thermoplastic connector pin for a modular conveyor belt. The connector pin comprises a core and a shell disposed about the core. A high strength polymer material is used for the core of the connector pin and gives the connector pin improved mechanical properties (i.e., improved tensile strength, shear strength, tensile or flexural modulus of elasticity, and compressive strength). The outside shell is made from a low-friction polymer material for improved wear resistance of the connector pin over standard pins that are currently used in the art. The outside shell is necessary because the high-strength core material can be very abrasive and can cause excess wear to the modular links and the connector pin.

The connector pin of the present invention is used to secure a first modular conveyor link to a second modular conveyor link. The first conveyor link typically has an end that includes a first series of eyes spaced apart from each other. The eyes include openings that are axially aligned with each other. The first conveyor link is also designed to intermesh with a similar second conveyor link that usually has an end that comprises a second series of eyes spaced apart from each other to define a series of spaces. The spaces in the second conveyor link are also adapted to receive the eyes of the first conveyor link. In addition, the eyes of the second conveyor link extend into the spaces between the eyes of the first conveyor link. The second conveyor link further includes openings that are axially aligned with respect to each other and the openings in the eyes of the first conveyor link. The connector pin of the present invention extends through the openings in the eyes of both links in order to connect the links together.

An object of this invention is to provide a connector pin for a modular conveyer belt that will increase the strength of the modular conveyer belt. Increasing the strength of modular conveyer belts is critical in many applications where a high-strength modular conveyer belt is required.

Another object of this invention is to provide a connector pin for a modular conveyor belt that increases the strength and stability of the modular conveyor belt over a range of temperatures. Increasing the useful range of operating temperatures where a modular conveyor belt will function effectively allows the modular conveyor belt to be used in a greater number of applications.

Another objective is to provide a modular conveyor belt which will resist stretch due to mechanical loading, over various environmental conditions including high temperatures and corrosive environments. A further object of the invention is to provide a connector pin for a modular conveyer belt which expands the type of applications where a modular conveyer belt is used. One such application is to use a modular conveyor belt to transport bottles or cans through pasteurizers used in breweries.

Still another object of the invention is to provide a connector pin for a conveyor belt that has a low-friction outer shell to minimize wear between the link ends and the connector pins.

Yet another object of the invention is to provide a connector pin for a modular conveyor belt that has increased wear resistance by minimizing connector pin bending to create a larger bearing surface between the inside of the link ends and the connector pins.

Other features and advantages of the invention will become apparent to those skilled in the art upon review of the following detailed description, claims, and drawings.

BRIEF DESCRIPTION OF THE DRAWINGS

FIG. 3 is an enlarged perspective view taken of the connector pin shown in FIG. 1 and with portions broken away for clarity.

FIG. 4 is a view similar to FIG. 3 and showing an alternative embodiment of the present invention.

DETAILED DESCRIPTION OF THE DRAWING SECTION

Figure 1:
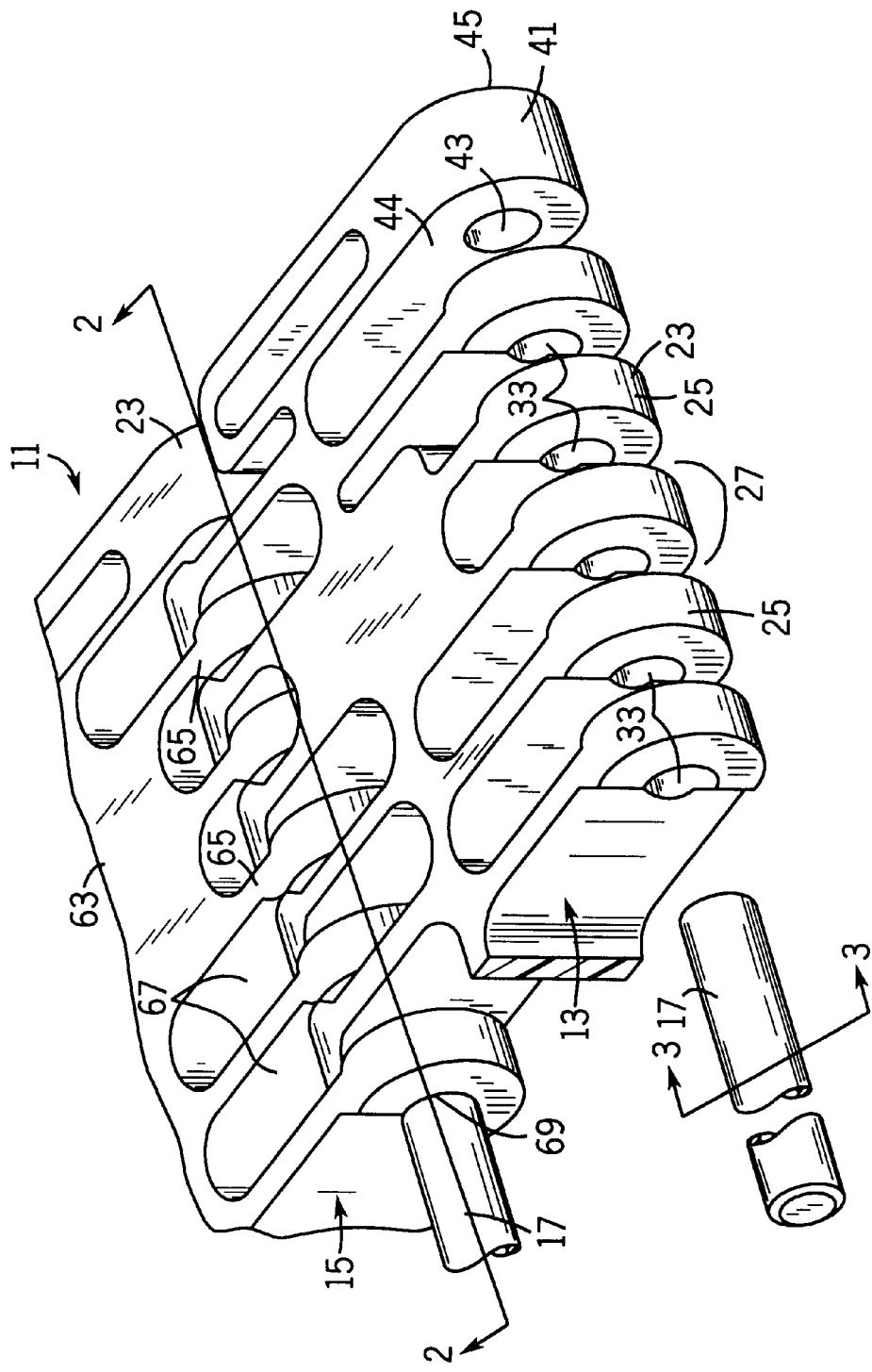
FIG. 1 is a partially exploded perspective view of a typical modular conveyor belt that includes the connector pin of the present invention.
Figure 2:
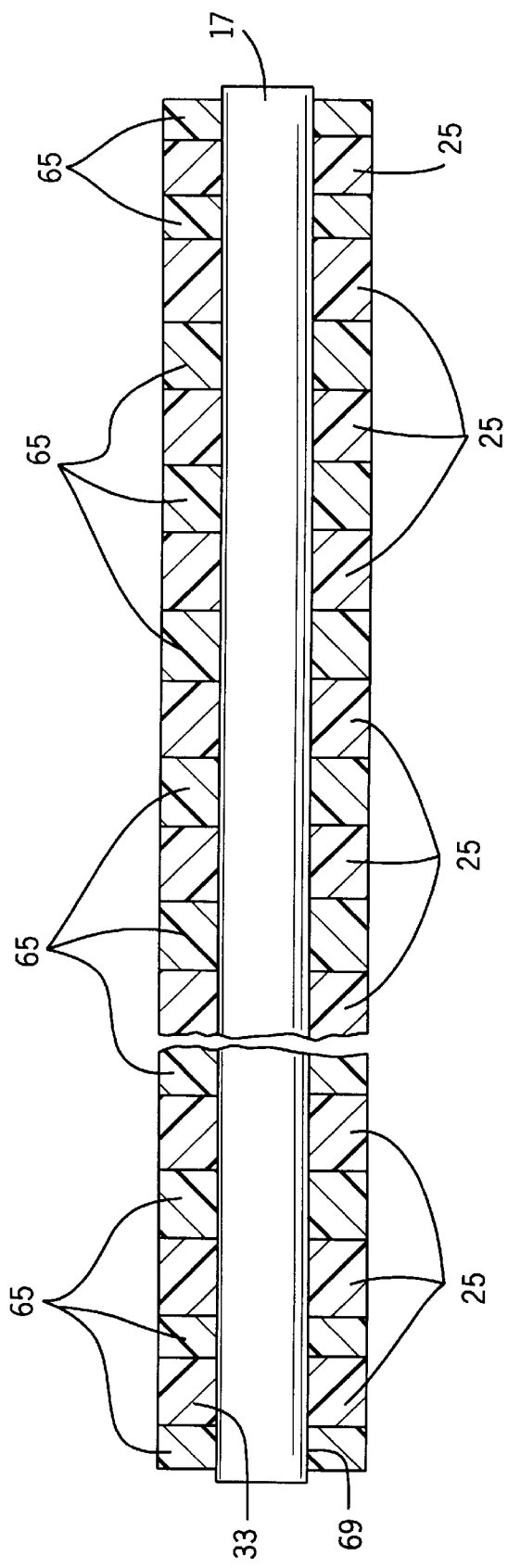
FIG. 2 is an enlarged section view taken along line 2—2 of FIG. 1 and shows the connector pin positioned within the link ends.

FIGS. 1 and 2 show a section of one typical modular conveyor belt that utilizes a connector pin 17 of the present invention. The modular conveyor belt includes a first conveyor link 13 and a second conveyor adjacent link 15. The connector pin 17 connects the first link 13 with the second link 15. The connector pin 17 of the present invention is applicable to any type of modular track assembly or modular conveyor, and the conveyor links can take any conventional form.

The first conveyor link 13 can be fabricated from any suitable substantially rigid material (typically thermoplastic), and includes an end 23 comprising a series of eyes or link ends 25 transversely spaced from each other to define there between a series of spaces 27. The series of eyes 25 include openings 33 that are axially aligned with respect to each other. The openings 33 in the series of eyes 25 can be cylindrical or can be elongated in the direction of travel of the modular conveyor belt.

The second conveyor element 15 is also fabricated from any suitable substantially rigid material and includes a series of eyes or link ends 65 axially spaced from each other to define therebetween a series of spaces 67 adapted to receive the eyes of the adjacent first conveyor link 13. The eyes 65 extend into the spaces 27 between the eyes 25 of the adjacent first conveyor link 13. The eyes 65 include openings 69 that are axially aligned with respect to each other and axially aligned with respect to the openings 33 of the adjacent first conveyor link 13. The openings 69 can be cylindrical or can be elongated in the travel direction of the modular conveyor belts.

As shown most clearly in FIG. 3, the connector pin 17 is fabricated from a core 71 made from one material and a shell 73 made from another material.

The core 71 is manufactured from a high-strength polymer. A fiber may be added to the polymer to increase important mechanical properties (i.e., tensile strength, shear strength, tensile or flexural modulus of elasticity and compressive strength). Adding a fiber to the polymer can significantly increase the stiffness of a normally low strength polymer. One preferred fiber which may be added to the thermoplastic core is glass, however, carbon fiber or aramid fiber may also be added.

The outside shell 73 is disposed about the core 71 of the connector pin 17 and is fabricated from a low-friction polymer. The low-friction polymer shell 73 provides a smooth cover for the abrasive fiber filled thermoplastic core. The shell 73 may be an unfilled resin.

The core 71 and the shell 73 are preferably made from materials that can chemically bond together (e.g., the core 71 is a 40% glass filled polypropylene and the shell 73 is an unfilled polypropylene). The materials in the core 71 and the shell 73 should bond together so that the shell 73 does not separate from the core 71.

In another embodiment of the present invention, a lubricant can be introduced into the low-friction polymer that forms the shell 73. Adding a lubricant to the shell 73 decreases the friction of the connector pin 17 even further resulting in decreased wear to the connector pin 17, the first conveyor link 13 and the second conveyor link 15 during operation of the modular conveyor belt.

The connector pin 17 of the present invention is typically made by co-extrusion. During the co-extrusion process the core 71 of the connector pin 17 is extruded from a high strength thermoplastic and the low-friction thermoplastic shell 73 is extruded about the core 71. The connector pin 17 may also be fabricated by injection molding.

In another embodiment of this invention (see FIG. 4), the connector pin 17 includes a central opening or bore 75 that extends through the connector pin 17 along a longitudinal axis of the connector pin 17. The bore 75 permits an accurate outer dimension of the connector pin 17 to be maintained during the co-extrusion process. In addition, the opening 75 facilitates removal of the connector pin 17 from the first conveyor link 13 and the second conveyor link 15 by the use of a tool that has an externally threaded head. The tool is screwed into the bore 75 in order to pull the connector pin out from within the links 13, 15.

The foregoing description of the present invention has been presented for purposes of illustration and description, furthermore, the description is not intended to limit the invention to the form disclosed herein. Consequently, variations and modifications commensurate with the above teachings, and the skill or knowledge of the relevant art, are within the scope of the present invention. The embodiments described herein are intended to explain the best mode for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A connector pin for connecting an end of a first conveyor link with an end of a second conveyor link that intermeshes with the end of the first conveyor link, the end of the first conveyor link and the end of the second conveyor link including openings that are axially aligned with respect to each other such that the connector pin can extend through the openings, said connector pin comprising:

an extruded core made from a high-strength polymer material; and an extruded shell made from a low-friction polymer material, said shell surrounding said core to provide a covering for said core.

2. The connector pin of claim 1 wherein said core includes a central bore that extends through said core along a longitudinal axis of said core.

3. The connector pin of claim 1 wherein said core and said shell are formed by extrusion.

4. The connector pin of claim 1, including a lubricant introduced into said low-friction polymer of said shell.

5. A connector pin for connecting an end of a first conveyor link with an end of a second conveyor link that intermeshes with the end of the first conveyor link, the end of the first conveyor link and the end of the second conveyor link including openings that are axially aligned with respect to each other such that the connector pin can extend through the openings, said connector pin comprising:

a) a core made from a high-strength polymer material;

b) a shell made from a low-friction polymer material, said shell surrounding said core to provide a covering for said core; and c) a lubricant introduced into said low-friction polymer of said shell.

6. The connector pin of claim 5 wherein said core includes a central bore that extends through said core along a longitudinal axis of said core.

7. The connector pin of claim 1 wherein said core and said shell are coextruded.

8. The connector pin of claim 1 wherein said shell and said core are chemically bonded together.

* * * * *

UNITED STATES PATENT AND TRADEMARK OFFICE
CERTIFICATE OF CORRECTION

PATENT NO.  : 6,164,439
DATED       : December 26, 2000
INVENTOR(S) : James E. Stebnicki, Robert E. Mitchell It is certified that error appears in the above-identified patent and that said Letters Patent is hereby corrected as shown below:

<u>Claim 3, column 6,</u>
Line 1, after "shell" [are formed by extrusion.] should be -- are chemically bonded together. --

<u>Claim 7, column 6,</u>
Line 20, after "claim", [1] should be -- 5 --.

<u>Claim 8, column 6,</u>
Line 22, after "claim", [1] should be -- 5 --.

Signed and Sealed this

Twenty-fifth Day of September, 2001

Attest:

*Nicholas P. Godici*

NICHOLAS P. GODICI
*Attesting Officer*  *Acting Director of the United States Patent and Trademark Office*